United States Patent
Chen

(10) Patent No.: US 11,341,524 B2
(45) Date of Patent: *May 24, 2022

(54) VERIFIED PARTICIPANT DATABASE SYSTEM FOR SURVEYS AND PROMOTIONS

(71) Applicant: Philip Chen, Redwood City, CA (US)

(72) Inventor: Philip Chen, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/093,925

(22) Filed: Nov. 10, 2020

(65) Prior Publication Data

US 2021/0110421 A1    Apr. 15, 2021

Related U.S. Application Data

(63) Continuation of application No. 16/224,791, filed on Dec. 19, 2018, now Pat. No. 10,867,316.

(51) Int. Cl.
G06Q 30/00    (2012.01)
G06Q 30/02    (2012.01)
G06F 16/335   (2019.01)

(52) U.S. Cl.
CPC ....... *G06Q 30/0225* (2013.01); *G06F 16/335* (2019.01); *G06Q 30/0203* (2013.01); *G06Q 30/0205* (2013.01); *G06Q 30/0217* (2013.01)

(58) Field of Classification Search
None
See application file for complete search history.

(56) References Cited

U.S. PATENT DOCUMENTS

| | | | | |
|---|---|---|---|---|
| 2011/0320375 A1* | 12/2011 | Zrike | ............ | G09B 7/02 705/319 |
| 2011/0320486 A1* | 12/2011 | Berkovitch | ............ | G06Q 10/06 707/769 |
| 2016/0371610 A1* | 12/2016 | Bronner | ............ | G06Q 20/045 |
| 2017/0286959 A1* | 10/2017 | Thomas | ............ | H04L 67/04 |
| 2018/0288029 A1* | 10/2018 | Nath | ............ | G06F 21/6245 |

OTHER PUBLICATIONS

IP.com Search Strategy (Year: 2021).*
STIC EIC 3600 Search Report for parent U.S. Appl. No. 16/224,791 (similar claims) dated Jun. 30, 2020. (Year: 2020).*
STIC EIC 3600 Search Report for U.S. Appl. No. 17/093,925 dated Aug. 20, 2021. (Year: 2021).*
IP.com NPL Search Strategy dated Aug. 13, 2021. (Year: 2021).*

* cited by examiner

*Primary Examiner* — Matthew T Sittner

(57) ABSTRACT

In general, the subject matter described in the specification can be embodied in methods, systems and program products for a verified participant database system that verifies information on potential participants for surveys and promotions that require numerous participants with certain characteristics. Among other features, the verified participant database system aggregates and preferably verifies information, for example, the demographic and purchasing information, of potential participants by receiving permission to obtain information from third-party sources.

12 Claims, 6 Drawing Sheets

VERIFIED PARTICIPANT DATABASE SYSTEM FOR SURVEYS AND PROMOTIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to a verified participant database system that verifies demographic and purchasing history information of potential participants against third-party information, and matches verified participants with appropriate surveys, promotions, and events.

A survey is a set of questions directed toward generating data from a particular group of people on a particular topic. Surveys may be used to gain information on demographics or purchasing habits, among other things. Traditionally, surveys have been conducted by phone or in-person interview, or by written questions and responses through physical or electronic means. The survey results from a representative sample are used to understand the attitude of a particular demographic or the overall population. There are numerous companies that conduct surveys as a service or to sell the survey data.

Survey results can only be used to understand the particular group when the survey participants are representative of that group. In other words, if the participants are not representative of a group, the results will not accurately reflect the attitude of that group. While some participants may be qualified by background research, for example, a survey of doctors may seek to sign up doctors certified in a particular region, this process is cumbersome and time-consuming. Further, many demographic questions relevant to a survey cannot be easily researched and rely on self-reporting by the participant. For example, a survey may seek information on the purchasing habits of a particular age or income group. However, the survey has no means of researching this information and must rely on the representations of the participants. If the self-reported demographic information is inaccurate, then the survey data may not be representative of the desired demographic group.

The advent of online and electronic surveys has increased survey opportunities but also compounded this problem. Many surveys are conducted online and are completed by participants at their convenience. However, online surveys allow participants to provide responses through the Internet from different locations. Surveys seeking to gather data on residents in a particular geographic area may receive responses from participants outside that target area who may have self-reported residence inside the target area.

Similarly, companies may target participants with certain demographic background or purchasing habits for promotions. Among other things, promotions are offered to attract suitable new consumers or entice existing consumers to purchase products or services. If information on the promotion participants is incorrect, the benefits for the company sponsoring the promotion may not be realized. Increased promotions offered online has increase the pool of potential participants but companies have less information on participants solicited online the through traditional means such as prior business. Other types of activities may likewise benefit from a pool of participants with verified demographic and purchasing habit information.

BRIEF SUMMARY OF THE INVENTION

The present invention pertains to an electronic digital computer machine and data processing system, methods for making and for using the machine, products produced thereby, as well as data structures and articles of manufacture pertaining thereto, all in the field of computerized aspects of verifying information for a participant database for surveys, promotions, and other events. More particularly, this invention relates to a digital electronic data processing system for a process for verifying information, including demographic and purchasing history information, of potential participants to match with events seeking participants with specific verified demographics and/or purchasing history. Further, the present invention involves computer-aided processing and communications, for example over the Internet, for retrieving participant information from third-party sources using permissions from the participant to aggregate verified information about the participant.

Available participant database systems allow participants to self-report demographic and purchasing background information. There are few, if any, barriers to prevent potential participants from misrepresenting this information in order to participate in a particular survey or promotion, especially where participants are solicited online. The described verified participant database system incorporates one or more checks to verify the background information of potential participants so that members of the desired demographic group can be identified for surveys, promotions, or other events.

In general, a participant system includes a database of potential participants that may be recruited online. The potential participants provide certain unverified demographic and/or purchasing information to qualify themselves for various events, including surveys and promotions. Potential participants may have incentive to misstate their demographic and/or purchasing history in order to qualify for events. For example, a promotion may seek to attract participants form a certain geography or income bracket. Or, a survey may seek the input of a participant that made a certain purchase or drives a certain brand of automobile. The database then matches participants with promotions or events based on unverified, self-reported information, such as demographic and/or purchasing information.

In the verified participant database system, the data card for a potential participant includes unverified information from the potential participant and may also include verified information about the potential participant. In particular, the participant has the opportunity to verify certain information, such as demographic and/or purchasing information, in the verified participant database system. A potential participant may provide consent for the improved system to obtain verification information from a third party. For example, a potential participant can provide consent for the verified participant database system to obtain financial records from a bank or documents from the government to verify the participant's location or financial status. Or, the participant may provide consent for the system to obtain purchasing records from a product vendor, for example an online store, to verify past purchases. In addition to third-party verification, the potential participant may provide copies of certain statements to the verified participant database system to verify other information. For example, the potential participant may provide a copy of a car registration or invoice for cable services to the database system to verify that the participant owns or leases a particular vehicle or uses particular services that may be relevant to a survey or promotion.

The verified participant database system provides mechanisms for third-party verification of the potential survey participant's information, including demographic and purchasing information. For example, the verified participant database system may obtain permission from the potential participant to retrieve supporting information or documentation, including in electronic form, from third parties to complete or verify the participant's demographic or purchasing information. The verified participant database system may also obtain permission from the potential survey participant under existing legal frameworks to request deletion of the information held by a third party. Such legal framework include, but are not limited to, the General Data Protection Regulation (GDPR) and the California Consumer Protection Act (CaCPA). The verified participant database system may track responses from third parties following a request to delete information, and follow up with the third party to ensure that the requested deletion is carried out.

The verified participant database system creates a profile and stores both unverified and verified demographic and purchasing information for each potential participant in a database. The potential participant can further provide contact information and contact preferences for events, and the database can store these information as part of the profiles. For example, a potential participant may only want to participate in events through electronic mail or online. Other potential participants may be willing to speak on the telephone, or even appear in person, on certain days at specified times for defined periods. The verified participant database system stores this information and also stores whether the participant's willingness to be available for an event, such as a survey, requires certain level of compensation (which can be hourly or total compensation).

The verified participant database system receives and stores surveys, promotions, or other events that seek participants with particular demographic or purchasing history, and searches the database of potential participant profiles to respond to these inquiries. The survey, promotion, or event can specify whether the particular requirements are satisfied by verified information (such as demographic or purchasing history information), unverified information, or a mixture of information. The verified participant database system also considers any availability restrictions (online, telephonic, or in-person) for the event and reviews the contact preferences for matching participants in the database to determine the appropriate participants to match with the event. The ability to match events with appropriate participants with verified information should be invaluable to companies conducting events such as surveys and promotions. In addition, participants in the database that have verified their information should benefit by being matched with more events, including surveys and promotions, which typically provide monetary compensation or benefits to participants.

DETAILED DESCRIPTION OF THE INVENTION

Figure 1:
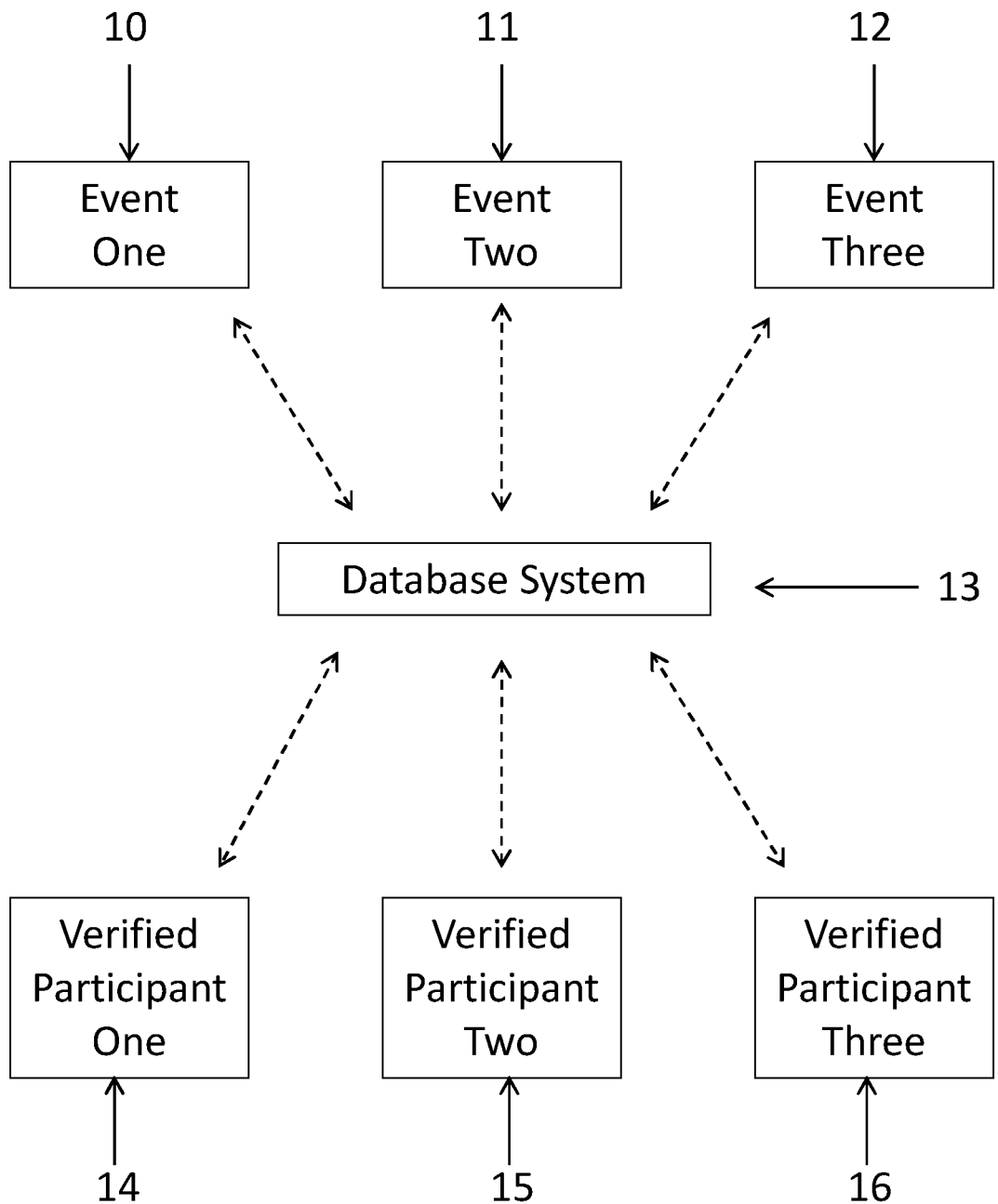
FIG. 1 is an exemplary schematic of a database system of verified participants according to the present invention.

Referring to FIG. 1, an exemplary schematic of a database system of verified participants according to the present invention is illustrated. The verified participant database system is comprised of, among other things, a database 10 that includes networking, storage, and processing hardware. The verified participant database receives, stores, indexes, and retrieves events and potential participants for those events. The verified participant database has networking equipment and is connected to the Internet so that it can communicate with remote devices through the Internet as well as with devices that are physically or locally linked. Among other things, the verified participant database stores information received for events and potential participants. For example, the verified participant database system may receive and store information in database entries for Event One 10 which is a survey, Event Two 11 which is another survey, and Event Three 12 which is a promotion. In this example, Event One 10 may be a survey that seeks participants between 18 to 25 years of age, who are verified as attending college in California, Event Two 11 may be a survey that seeks participants between 26 to 35 years of age, who have been verified as in Washington, and having an income of $50,000 to $100,000, and Event Three 12 may be a promotion for Brand X products seeking participants who have been verified as purchasing Brand Y products in the past year and located in San Francisco.

In one embodiment, the verified participant database system may receive and store information for Verified Participant One 14, Verified Participant Two 15, and Verified Participant Three 16. In this context, verified participants are potential participants that have submitted background information, such as demographic or purchasing information, to participate in events and have verified certain information. In particular, in the verified participant database system, participants have the opportunity to verify certain demographic and/or purchasing information among other things. A potential participant may provide consent for the improved participant database system to obtain verification information from a third party. Or, the potential survey participant may provide copies of certain statements to the improved participant database system to verify other information. For example, Verified Participant One 14 may store information in a database entry for participant one, including unverified information on the participant's age, and verified information that the participant is attending UC Berkeley in California. The verification may be, among other things, proof of current enrollment at the university. The verified participant database system may match, in this example, Verified Participant One 14 as a potential participant for Event One 10. When there is a match, the verified participant database system may, among other things, deliver questions for an electronic survey to the participant and transmit responses to the company promoting the event, provide details of how to obtain a promotion to the participant, or connect the participant with the promoting company to participate in an event. The verified participant database system may also first compare the event details against the contact preferences of potential participants that meet the criteria to identify participants who may be willing to participate in the event based on the specified date(s), time(s), and form(s) of contact specified by the promoter in the event details before identifying matching participant(s) with the event.

Figure 2:
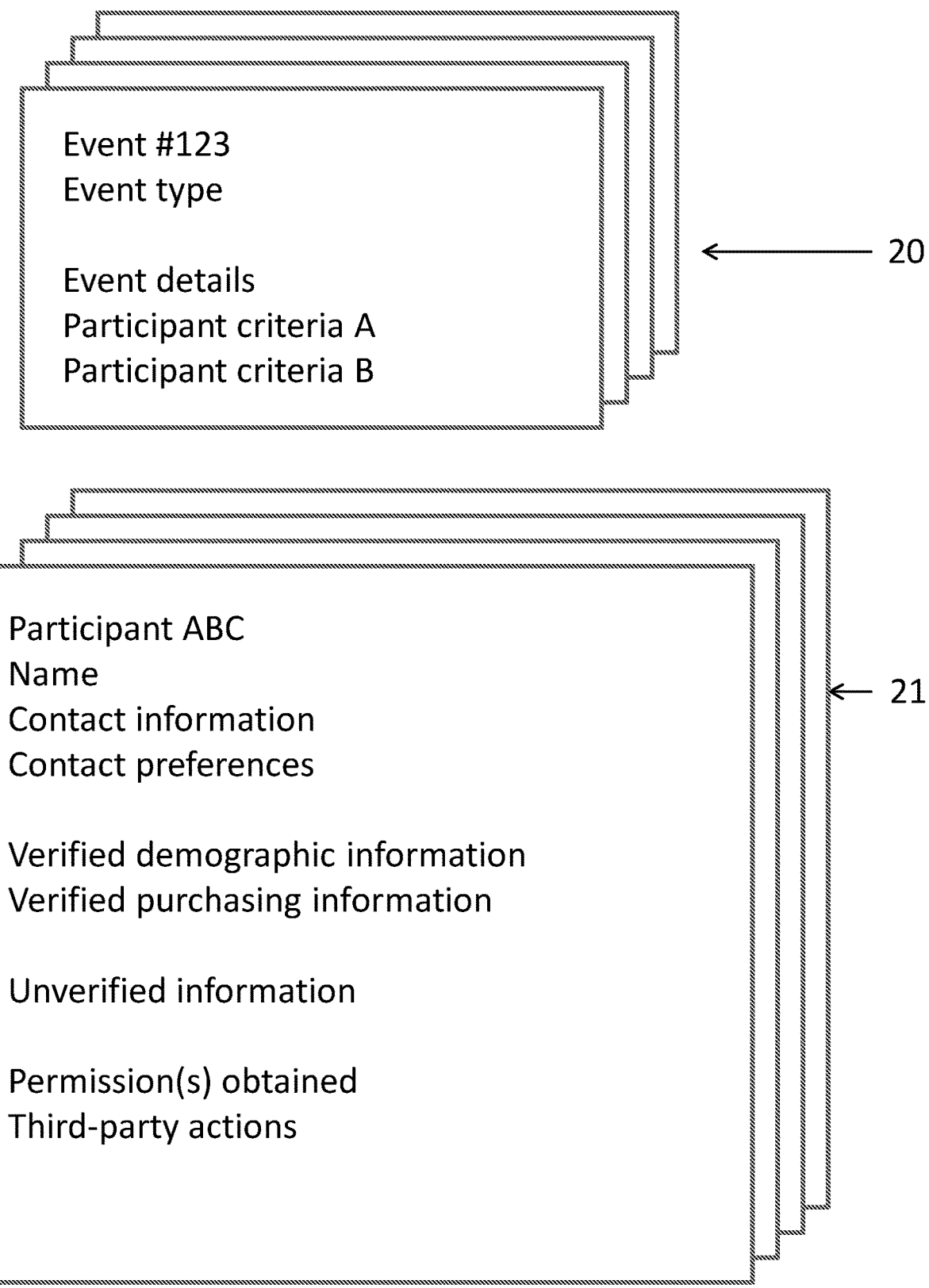
FIG. 2 is an exemplary participant database entry and an exemplary event database entry in the verified participant database system according to the present invention.

Referring to FIG. 2, an exemplary event database entry 20 and an exemplary participant database entry 21 according to the present invention are illustrated. For example, the event database entry 20 for Event #123 specifies Event type, Event details, Participant criteria A, and Participant criteria B. Information on the Event type is received from the promoting company and stored in the database, and may be a survey, promotion, or other type of event that requires participants. The Event details are received and stored by the verified participant database system and may include details such as the company that is promoting the event and the details for participating. Participant criteria A and Participant criteria B store one or more event participation criteria received from the promoting company. For example, Participant criteria A may include the criteria for participants and may include participant criteria such as age, location, income, or recent purchases. For example, Participant criteria B may include the dates and times for participation and the method of participation, such as online, by phone, at a location, or a combination of these, or other methods of communication and participation.

In one embodiment, the participant database entry 21 for Participant ABC stores information relating to the participant, which may include Name, Contact information, Contact preferences, Verified demographic information, Verified purchasing information, Unverified information, Permission(s) obtained, and Third-party actions. For example, the potential participant identified as Participant ABC may provide his or her Name, Contact information, Contact preferences, and Unverified information, which is stored on the participant database entry 21. The verified participant database system allows the Participant ABC the opportunity to verify certain demographic and/or purchasing information. Participant ABC may provide permission(s) for the system to obtain information or documents from a third party to verify certain demographic and/or purchasing information. For example, Participant ABC may provide permission for the verified participant database system to obtain financial records from a bank or the government to verify the participant's financial status, or the participant may provide permission for the improved system to obtain purchasing records from a sales source, for example an online store, to verify past purchases. In addition to permission for third-party verification, Participant ABC may provide copies of certain statements to the verified participant database system to verify other information. For example, Participant ABC may provide a copy of a car registration or invoice for cable services to the verified participant database system to verify that Participant ABC owns or leases a particular vehicle or uses particular services that may be relevant to a survey or promotion.

In one embodiment, the verified participant database system provides mechanisms for aggregation or verification of the potential survey participant's demographic or purchasing information via permissions. For example, the improved system may obtain permission from the potential participant to retrieve supporting information or documentation, including in electronic form, from third parties to complete or verify the participant's demographic or purchasing information and store that verified information. The verified participant database system may reconcile the verified information with the unverified information such that information, such as demographic or purchasing information, which has been both provided by the potential participant and also verified, is stored only as verified information and not as unverified information.

The verified participant database system may also obtain permission from the potential survey participant under existing legal frameworks to request deletion of the information held by a third party. Such legal frameworks include, but are not limited to, the General Data Protection Regulation (GDPR) and the California Consumer Protection Act (CaCPA). In one embodiment, the verified participant database system stores these permissions on the participant database entry 21 and also stores any verified information and a summary of third-party actions in response to use of the permissions. For example, the participant database entry 21 may store information that Source A provided verification of certain information or that Source B was requested to delete held information but has not yet responded. Other statuses may include requested to provide information but has not yet responded, requested to delete information and deletion confirmed, and requested to delete information but request denied. This last status may require additional follow up by the verified participant database system depending on the reason for denial. For example, the system may need to obtain a deletion permission in a different form, or it may need to continue pressing on the third-party source, or it may need to contact a regulator to enforce the privacy framework.

The CaCPA is one example of a legal framework that supports retrieval and deletion of personal information held by a third party. The CaCPA defines personal information broadly to include identifying information (such as name and address), educational information, professional and employment information, and Internet activity (such as online purchasing history), among other things. The CaCPA provides that certain businesses must provide a consumer's personal information to the consumer in a portable format; if technically feasible, the personal information should be transferred in a format that is readily useable. The GDPR likewise provides this legal framework for portability of personal data for the European Union. Thus, once retrieval permissions are received, under a framework such as the CaCPA, the verified participant database system may retrieve verified information from a third-party source on a participant's education, profession, employment, and purchasing history, to the extent held by that third party. The personal data received from the third-party source can then be sorted, indexed, and stored in the participant's database entry.

Consumers also have the right to request deletion of personal information under the CaCPA, and certain businesses must comply within the statutory period. Thus, the verified participant database system may receive delete permissions from a participant, and transmit those permissions to a third party to request deletion of personal information after retrieving that information. The deletion right under the CaCPA is similar to the right to be forgotten under the GDPR, and numerous EU citizens have elected to exercise their right to delete personal data under the GDPR.

In one embodiment, the participant database entry 21 further may store under "Contact information" information from the potential participant such as home and/or work address, phone number, email address, social media site identifiers, and other means by which the potential participant maybe be contacted. The participant database entry 21 further may store under "Contact preferences" information from the potential participant such as dates and times and means of contact by which the potential participant wants to be contacted. For example, a potential participant may only want to participate in events through electronic mail or online. Other potential participants may be willing to speak on the telephone, or even appear in person, on certain days at specified times for defined periods. The verified participant database system stores this information and also stores whether the participant's willingness to be available for an event, such as a survey, requires certain level of compensation (which can be specified as hourly or total compensation).

Figure 3:
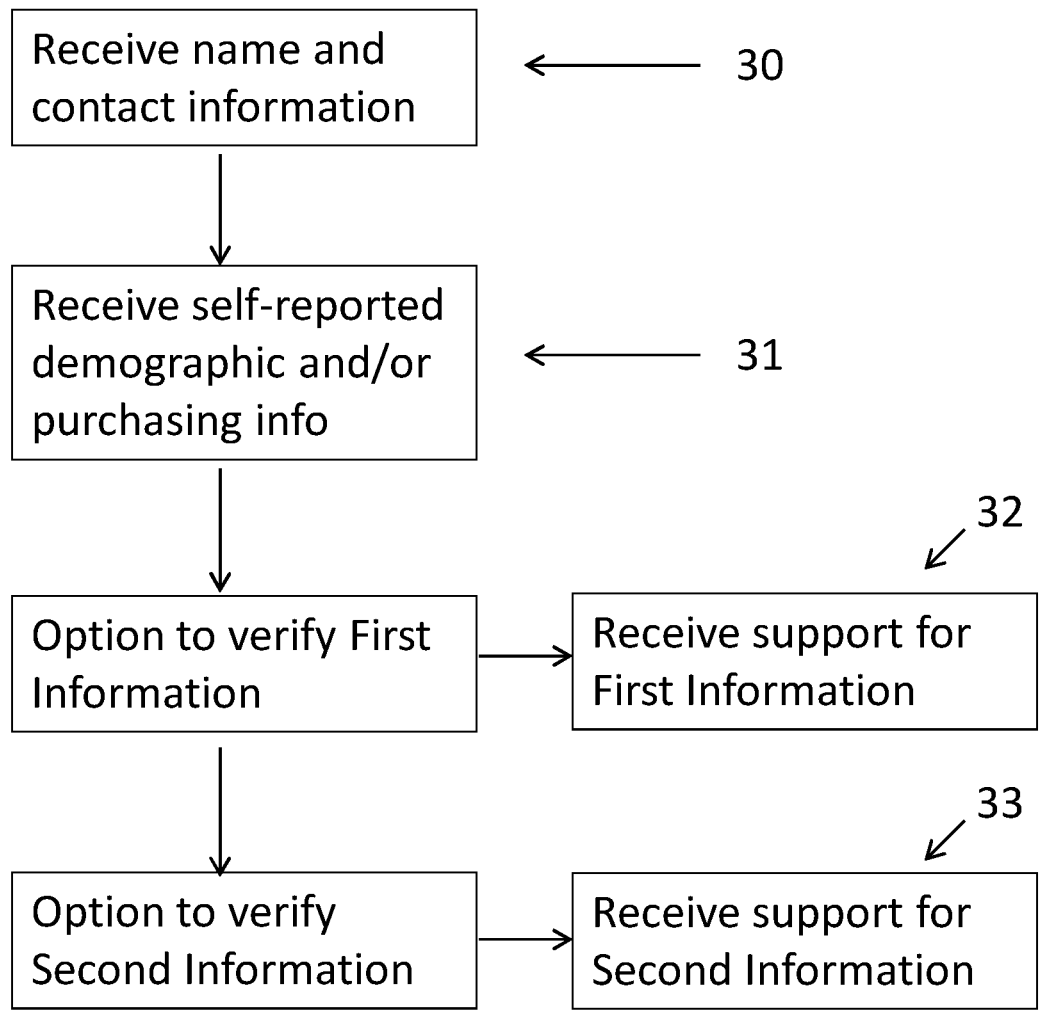
FIG. 3 is an exemplary process for intake of a participant's information according to the present invention.

Referring to FIG. 3, an exemplary process for intake of a participant's information according to the present invention is illustrated. The verified participant database system receives and stored the name and contact information of the potential participant in step 30. This may include the name of the potential participant and one or more forms of contact, such as home and/or work address, phone number, email address, social media site identifiers, and other means by which the potential participant maybe be contacted. In step 31, the verified participant database system receives and stores the self-reported demographic and/or purchasing information of the potential participant. Self-reported demographic information may include the participant's age, gender, marital status, ethnicity, education, profession, income, net worth, and location. Self-reported purchasing information may include information on the category of purchase (such as consumer item or cable service), the brand of the item or service purchased (such as Cuisinart or Time Warner), the specific item or service purchased (such as a blender or Preferred TV package), when it was purchased (such as within the last six months or current subscription), and how it was purchased (whether it was financed or leased). The information self-reported by the potential participant is stored as unverified information. For example, the information may be stored with a marker or indicator that it is unverified information.

In one embodiment, in step 32, the potential participant has an option to verify a First Information and the verified participant database may receive the verification support for the First Information. For example, the potential participant may elect to verify the participant's purchase of a consumer item, Cuisinart blender, within the last six months, and the verified participant database system may receive a purchase receipt as verification support for the details of the blender purchase and store it as verified information. The verified participant database system may implement the status of the information with a marker or indicator, which would change from unverified information to verified information with appropriate verification. Or, the verified participant database system may simply store the information in a chart where unverified information is stored in one location and verified information is stored in another. Likewise, in step 33, the potential participant may be offered the option to verify a Second Information in the same manner. For example, the potential participant may elect to verify the participant's current subscription to cable television provider, Time Warner, and the verified participant database system may receive a current monthly bill as verification support and store the details of the cable subscription information as verified information. In each of the steps, the verified participant database stores the verified and unverified information for the participant.

Figure 4:
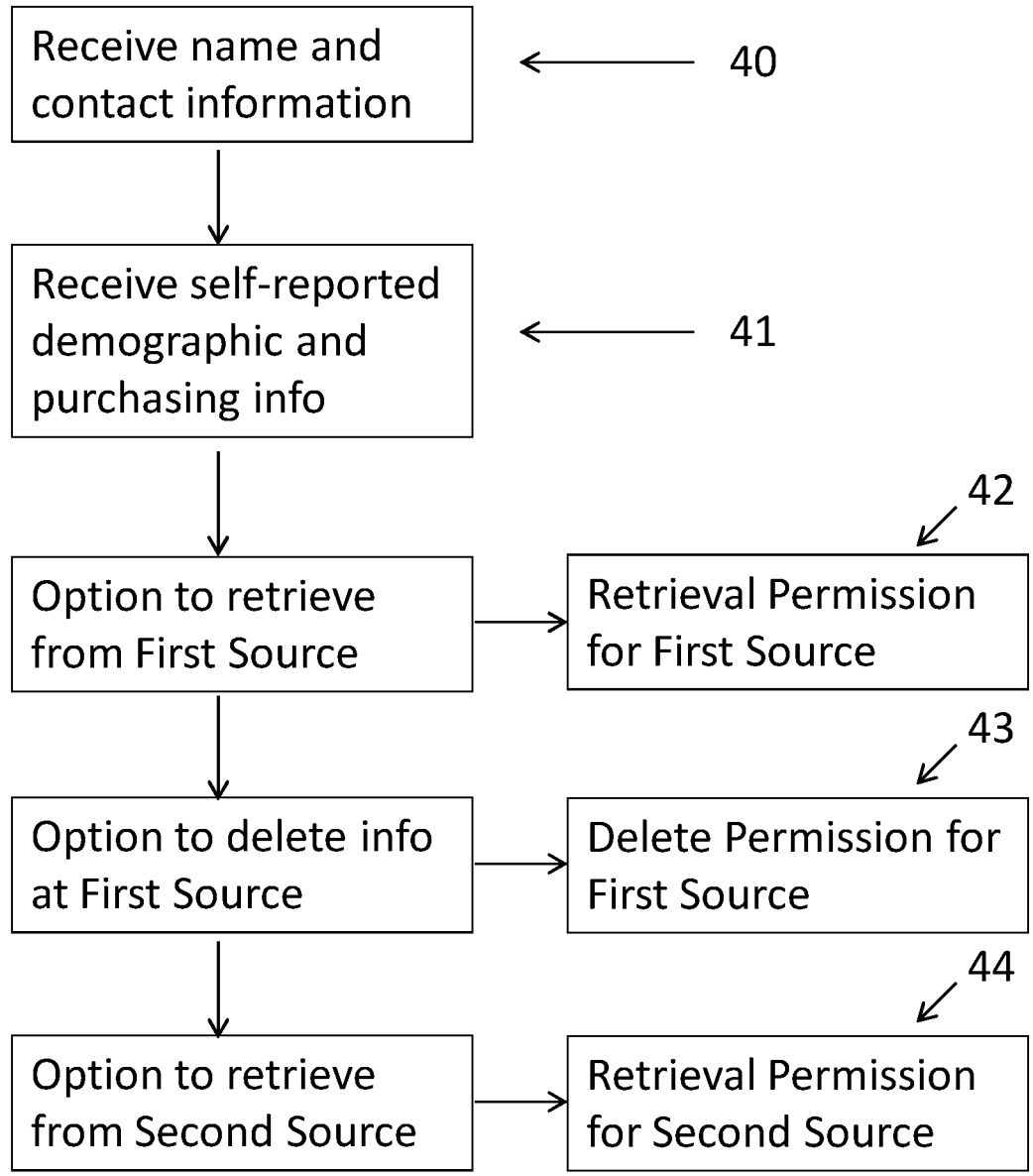
FIG. 4 is an alternative exemplary process for intake of a participant's information according to the present invention.

Referring to FIG. 4, another exemplary process for intake of a participant's information according to the present invention is illustrated. The verified participant database system receives and stores the name and contact information of the potential participant in step 40. This may include the name of the potential participant and one or more forms of contact, such as home and/or work address, phone number, email address, social media site identifiers, and other means by which the potential participant maybe be contacted. In step 41, the verified participant database system receives and stores the self-reported demographic and/or purchasing information of the potential participant. Self-reported demographic information may include the participant's age, gender, marital status, ethnicity, education, profession, income, net worth, and location. Self-reported purchasing information may include information on the category of purchase (such as consumer item or cable service), the brand of the item or service purchased (such as Cuisinart or Time Warner), the specific item or service purchased (such as a blender or Preferred TV package), when it was purchased (such as within the last six months or current subscription), and how it was purchased (whether it was financed or leased).

In one embodiment, in step 42, the potential participant has an option to retrieve information from a First Source in order to verify certain information or to aggregate verified information. For example, the potential participant may elect to retrieve information to verify the participant's purchase of a consumer item, such as a Vitamix blender, and the verified participant database system may receive a First Retrieval Permission from the participant to obtain purchase history from a First Source, such as Target. The verified participant database can then contact the First Source and provide the Retrieval Permission, and receive documents or information from the third-party that verifies the participant's purchase of the Vitamix blender. This information can be stored as verified information. In another embodiment, step 42 may alternatively, or additionally, be an option to retrieve and aggregate participant information from a third-party source as the Retrieval Permission may provide access to participant information in the First Source's possession that exceeds the scope of the unverified information. The information retrieved may be used to only verify information that the participant requested. Or, the information retrieved from the First Source may be preferably used to populate the participant's database entry with verified information. For example, Amazon.com provides tools for downloading shipment, return, and refund activity. The retrieval permission for Amazon.com may include the participant's credentials for logging into Amazon.com. The set of retrieved data is in CSV format file, which is compatible with Microsoft Excel, and the verified participant database system can parse or index the retrieved data to identify verified purchase history of the participant at Amazon.com. As another example, under both the CaCPA and the GDPR, the participant will need to prove their identity in order to retrieve information. The retrieval permission may include the participant's permission to retrieve as well as proof of identity for the participant. After verifying identity, the third-party source may send a zip file with the participant's information or a link to where the participant's information is located. The participant's data will be provided in a portable format and the verified participant database system may index or parse the data to retrieve relevant verified information on the participant. As a further example, the Internal Revenue Service provides tools for retrieving a tax transcript containing demographic information on the participant. The retrieval permission for a tax transcript may require the participant's social security number, date of birth, filing status, mailing address, personal account information on a line of credit, and a mobile phone. The verified information retrieved may include marital status and gross income.

In one embodiment, in step 43, the participant may be offered the option to delete the information at the First Source. If the participant desires to delete that information, the participant may provide the verified participant database system with Delete Permission for the First Source. The verified participant database system may present Delete Permission to the First Source to request that the First Source delete some or all of the information stored by the First Source on participant. Preferably, the request to delete occurs after any information on the participant, including demographic and/or purchasing history information, is obtained by the verified participant database system from First Source. The Delete Permission may be a request under GDPR, CaCPA, or other applicable rules or regulations that require a receiving organization to comply with the request to delete personal information.

In one embodiment, in step 44, the potential participant is given the option to retrieve information from a Second Source and may provide a Second Retrieval Permission to the verified participant database system. The retrieved information may be used to verify certain unverified information. Alternatively, step 44 may be an option to aggregate verified information from the Second Source. The verified participant database system according to the present invention can include further steps to provide options to delete the Second Information at the Second Source, to verify a Third Information at a Third Source, to delete a Third Information, and so on. In each of the steps, the verified participant database system stores the verified and unverified information for the participant. The verified participant database system preferably saves information tracking the status of requests to delete the participant's information at third-party sources and the response received, including whether the deletion request was accepted, rejected, or completed. The verified participant database system may receive confirmation from third-party sources on whether the requested deletions were completed. The verified participant database system be configured to generate reports on the third-party sources that have not complied with deletion requests, and to follow up with those third-party sources.

Figure 5:
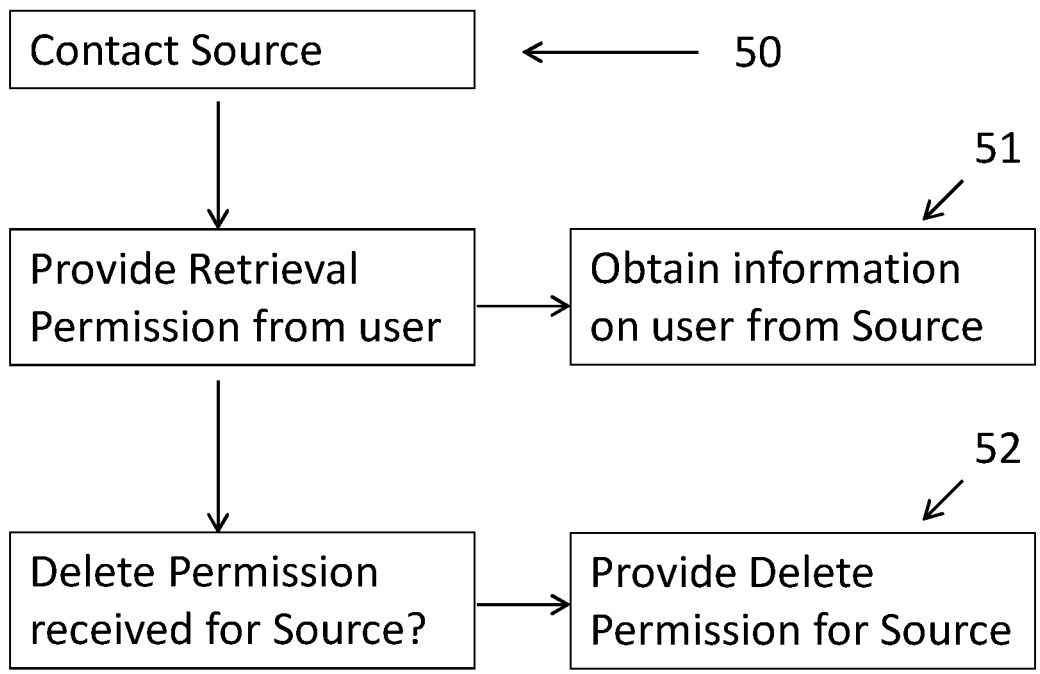
FIG. 5 is an exemplary process for retrieval of verified information for a participant according to the present invention.

Referring to FIG. 5, an exemplary process for intake of a participant's information from a third party according to the present invention is illustrated. The verified participant database system receives and stores the name and other information of a potential participant, including Retrieve Permission and possibly Delete Permission for a third-party source. These permissions may have been obtained in a process such as that illustrated in FIG. 4. In step 50, the verified participant database system contacts a third-party source to verify information provided by the participant. In step 51, the verified participant database system provides the Retrieval Permission from the participant to the third-party source and obtains information to verify information, such as demographic or purchasing information, on the participant. The verified participant database system may store this information corroborated by the third-party source as verified information of the participant. In step 52, the verified participant database system checks to see if Delete Permission was provided by the participant for the third-party source. If Delete Permission was provided, the verified participant database system may provide the Delete Permission to the third-party source and request deletion of some or all of the participant's information stored at the third-party source. Preferably, the verified participant database system tracks the deletion notifications to, and the responses to the notices from, the third-party sources.

Figure 6:
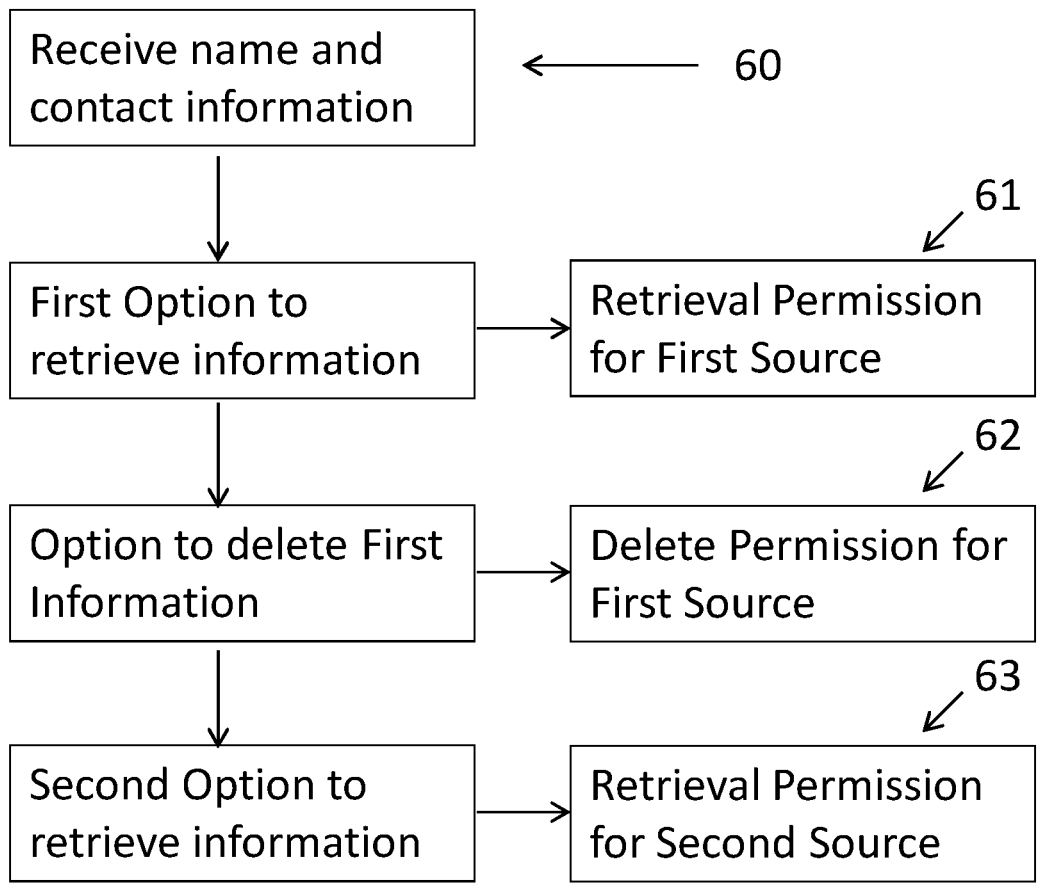
FIG. 6 is another exemplary process for intake of a participant's information according to the present invention.

Referring to FIG. 6, another exemplary process for intake of a participant's information according to the present invention is illustrated. The verified participant database system receives and stores the name and contact information of the potential participant in step 60. This may include the name of the potential participant and one or more forms of contact, such as home and/or work address, phone number, email address, social media site identifiers, and other means by which the potential participant maybe be contacted. In step 61, the verified participant database system provides the potential participant with a First Option to retrieve information from a First Source. The verified participant database may receive Retrieval Permission from the participant to retrieve verified information from a First Source. The information to be retrieved from the First Source may or may not be enumerated, and may include identification, demographic, and/or purchasing information. The verified participant database system may contact the First Source and provide Retrieval Permission, and receive documents or electronic data from the First Source that comprises information on the participant. This information can be stored as verified information. Likewise, in step 62, the potential participant may be offered the option to delete the First Information at the First Source. If the participant desires to delete that information, the participant may provide the verified participant database system with Delete Permission for the First Source. The verified participant database system may present Delete Permission to the First Source to request that the First Source delete some or all of the information stored by the First Source on participant. Preferably, the request to delete occurs after any information on the participant, including demographic and/or purchasing history information, is obtained by the verified participant database system from First Source.

In one embodiment, in step 63, the potential participant is given a Second Option to retrieve information from a Second Source, and may provide Retrieval Permission for the Second Source to the verified participant database system. The verified participant database system according to the present invention can include further steps to provide options to delete the Second Information at the Second Source, to retrieve a Third Information at a Third Source, to delete a Third Information, and so on. The verified participant database system stores the verified and unverified information for the participant. The verified participant database system preferably saves information tracking the status of requests to delete the participant's information at third-party sources and the response received, including whether the deletion request was accepted, rejected, or completed.

In the exemplary figures and embodiments, enumerated items are shown as individual elements. In actual implementations of the invention, however, they may be inseparable components of software or electronic devices such as a computer. The actions described above may be implemented all or in part in software that may be embodied in an article of manufacture that includes a program storage medium. The program storage medium includes data signals embodied in one or more of a, computer disk (magnetic, or optical (e.g., CD or DVD, or both)), non-volatile memory, tape, a system memory, and a computer hard drive.

One skilled in the art will realize the systems and methods described may be embodied in other specific forms without departing from the spirit or essential characteristics thereof. The foregoing embodiments are therefore to be considered in illustrative rather than limiting of the described systems and methods. The scope of the invention is indicated by the claims, rather than the foregoing description, and all changes that come within the meaning and range of equivalency of the claims are intended to be embraced therein.

The invention claimed is:

1. A computerized method carried out by a processing unit for creating a verified participant database system, the method comprising:
   receiving at a database a first information from a first participant;
   storing on the database the first information from the first participant as unverified information on the first participant;
   receiving at the database a second information from the first participant that is information from a third-party source regarding the first participant;
   storing at the database the second information from the first participant as verified information on the first participant;
   receiving at the database a first participation requirement for a first event from a first promoter that requires verified information;
   receiving at the database a second participation requirement for the first event from the first promoter;
   verifying at the database that the first participant's verified information meets the first participation requirement;
   verifying at the database that the first participant's verified information or unverified information meets the second participation requirement;
   notifying the first promoter that at least one participant is eligible for the first event;
   receiving at the database a summary of the first event from the first promoter;
   displaying on a remote computer to the first participant the summary of the first event from the first promoter;
   receiving at the database a confirmation of interest to participate from the first participant; and
   notifying the first promoter that at least one participant has confirmed interest in participating in the first event.

2. The method of claim 1 further comprising the following steps before displaying the summary of the first event to the first participant:
   receiving at the database one or more event requirements from the first participant;
   receiving at the database a set of event conditions for the first event from the first promoter; and
   verifying that the one or more event requirements from the first participant are satisfied by the event conditions for the first event.

3. The method of claim 2, wherein the one or more event requirements from the first participant include the subject matter of potential events.

4. The method of claim 2, wherein the one or more event requirements from the first participant include the manner of participating in potential events.

5. A computer system for verifying information on participants and matching participants with events, the computer system comprising:
   a storage device;
   a network interface; and
   a processor coupled to the storage device and communicably coupled to the network interface, the processor executing software instructions that configure the processor to:
   receive at the processor a first information from a first participant;
   store in the storage device the first information from the first participant as unverified information on the first participant;
   receive at the processor a second information from the first participant that is information from a third-party source regarding the first participant;
   store in the storage device the second information from the first participant as verified information on the first participant;
   receive at the processor a first participation requirement for a first event from a first promoter that requires verified information;
   receive at the processor a second participation requirement for the first event from the first promoter;
   verify at the processor that the first participant's verified information meets the first participation requirement;
   verify at the processor that the first participant's verified information or unverified information meets the second participation requirement;
   cause to be displayed to the first promoter a message that at least one participant is eligible for the first event;
   receive at the processor a summary of the first event from the first promoter;
   cause to be displayed to the first participant the summary of the first event from the first promoter;
   receive at the processor a confirmation of interest to participate from the first participant; and
   cause to be displayed to the first promoter a message that at least one participant has confirmed interest in participating in the first event.

6. The apparatus of claim 5, wherein the processor is further configured to:
   receive at the processor one or more event requirements from the first participant;
   receive at the processor one or more event conditions for the first event from the first promoter; and
   verify using the processor that the one or more event requirements from the first participant are satisfied by the event conditions of the first event.

7. The apparatus of claim 6, wherein the one or more event requirements received at the processor from the first participant includes the subject matter of potential events.

8. The apparatus of claim 6, wherein the one or more event requirements received at the processor from the first participant includes the manner of participating in potential events.

9. One or more non-transitory computer-readable media having embodied thereon computer-executable instructions that, when executed, perform a method for creating a verified participant database, the method comprising:
   receiving at a database a first information from a first participant;
   storing on the database the first information from the first participant as unverified information on the first participant;
   receiving at the database a second information from the first participant that is information from a third-party source regarding the first participant;
   storing at the database the second information from the first participant as verified information on the first participant;

receiving at the database a first participation requirement for a first event from a first promoter that requires verified information;

receiving at the database a second participation requirement for the first event from the first promoter;

verifying at the database that the first participant's verified information meets the first participation requirement;

verifying at the database that the first participant's verified information or unverified information meets the second participation requirement;

notifying the first promoter that at least one participant is eligible for the first event;

receiving at the database a summary of the first event from the first promoter;

displaying on a remote computer to the first participant the summary of the first event from the first promoter;

receiving at the database a confirmation of interest to participate from the first participant; and notifying the first promoter that at least one participant has confirmed interest in participating in the first event.

10. The non-transitory computer-readable media of claim 9 having embodied thereon computer-executable instructions that, when executed, perform a method further comprising the following steps before displaying the summary of the first event to the first participant:

receiving at the database one or more event requirements from the first participant;

receiving at the database a set of event conditions for the first event from the first promoter; and verifying that the one or more event requirements from the first participant are satisfied by the event conditions for the first event.

11. The non-transitory computer-readable media of claim 10 having embodied thereon computer-executable instructions that, when executed, perform a method, wherein the one or more event requirements from the first participant include the subject matter of potential events.

12. The non-transitory computer-readable media of claim 10 having embodied thereon computer-executable instructions that, when executed, perform a method, wherein the one or more event requirements from the first participant include the manner of participating in potential events.

* * * * *